United States Patent [19]
Grabhorn

[11] Patent Number: 5,595,458
[45] Date of Patent: Jan. 21, 1997

[54] BIOFILTER BAGS FOR EROSION CONTROL

[75] Inventor: Howard Grabhorn, Tualatin, Oreg.

[73] Assignee: Grabhorn, Inc., Beaverton, Oreg.

[21] Appl. No.: 269,051

[22] Filed: Jun. 29, 1994

[51] Int. Cl.$^6$ ................................ E02D 5/00; E02B 3/12
[52] U.S. Cl. .......................... 405/258; 210/170; 405/15; 405/16
[58] Field of Search ................ 405/258, 15, 16, 405/36, 270; 210/170, 163, 164, 165, 923

[56] References Cited

U.S. PATENT DOCUMENTS

| | | | |
|---|---|---|---|
| 909,423 | 1/1909 | Keller | 405/16 |
| 2,201,279 | 5/1940 | Willing | 405/16 |
| 2,842,897 | 7/1958 | Finn . | |
| 3,374,635 | 3/1968 | Crandall . | |
| 3,561,219 | 2/1971 | Masazumi . | |
| 3,847,722 | 11/1974 | Kistner | 405/258 X |
| 3,871,182 | 3/1975 | Estruco . | |
| 3,957,098 | 5/1976 | Hepworth et al. . | |
| 4,353,946 | 10/1982 | Bowers . | |
| 4,635,576 | 1/1987 | Bowers . | |
| 4,655,637 | 4/1987 | Vignocchi . | |
| 5,051,028 | 9/1991 | Houck et al. | 405/43 X |
| 5,338,131 | 8/1994 | Bestmann | 405/15 X |
| 5,421,123 | 6/1995 | Sakate et al. | 405/258 X |

FOREIGN PATENT DOCUMENTS

| | | | |
|---|---|---|---|
| 220385 | 3/1957 | Australia . | |
| 2470196 | 6/1981 | France | 405/50 |

*Primary Examiner*—Dennis L. Taylor
*Attorney, Agent, or Firm*—Klarquist Sparkman Campbell Leigh & Whinston, LLP

[57] ABSTRACT

A water permeable erosion control bag having a flexible mesh wall with openings through which water can flow. Discrete hammer-milled wood fragments within the bag.

14 Claims, 2 Drawing Sheets

BIOFILTER BAGS FOR EROSION CONTROL

The present invention relates to erosion control, specifically to the use of recycled log and stump waste to prevent loss of topsoil in locations where soil is temporarily disturbed by human activity.

Federal, state and municipal regulations are increasingly requiring erosion control around construction sites, placing limitations on dumping waste materials in landfills, and restricting the burning of waste timber materials. The present invention helps to solve these persistent environmental problems by providing a means of preventing topsoil erosion in areas where the soil is temporarily disturbed through construction, farming, or similar activities, while at the same time providing a means for disposing recycled log and stump waste without overburdening landfills or increasing air pollution burdens by burning.

The two most common methods of erosion control around construction sites are the use of silt fences or straw bales strategically placed to trap topsoil. Other erosion control methods include application of interlocking concrete and other slab arrangements, use of jute sacking pegged to the soil, and use of sand bags on dikes and revetments. Although all of these methods have proved effective for certain applications, they have certain disadvantages.

Straw bales have the disadvantage that they do not contour to the landscape, they must be removed from the site after construction is completed, and, because they do not permit water to wash through them, gullies or channels are often eroded around and under them. Any straw that is spread over the site after the bales have served their useful purpose is apt to contain weed seeds that are a nuisance to subsequent landscaping.

Silt fences also have the disadvantage of not contouring to the landscape, and in addition water washes under them and they can be easily knocked over by water surges.

The other common methods of erosion control are either too expensive or are physically unsuitable for controlling erosion around construction sites.

The present invention solves the disadvantages of the commonly-used erosion control methods.

DETAILED DESCRIPTION

Figure 1:
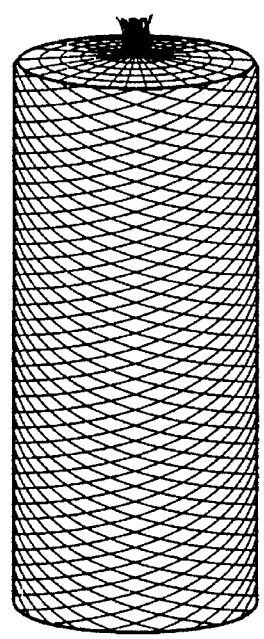
FIG. 1 is a perspective view of a water-permeable erosion control bag constructed in accordance with the teachings of this invention. In the preferred embodiment the size-selected wood fragments are in the range of ⅜" to 1½" and are bagged in 12" diameter extruded high density polyethylene mesh of ½" mesh size.
Figure 2:
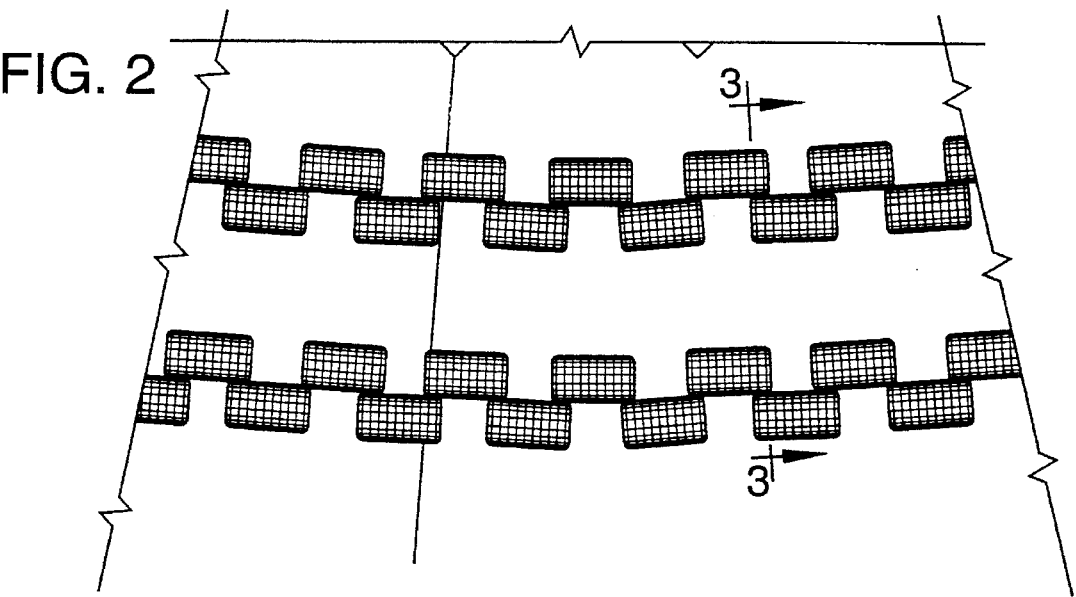
FIG. 2 is plan view showing placement of biofilter bags on a sloping surface to control erosion thereon.
Figure 3:
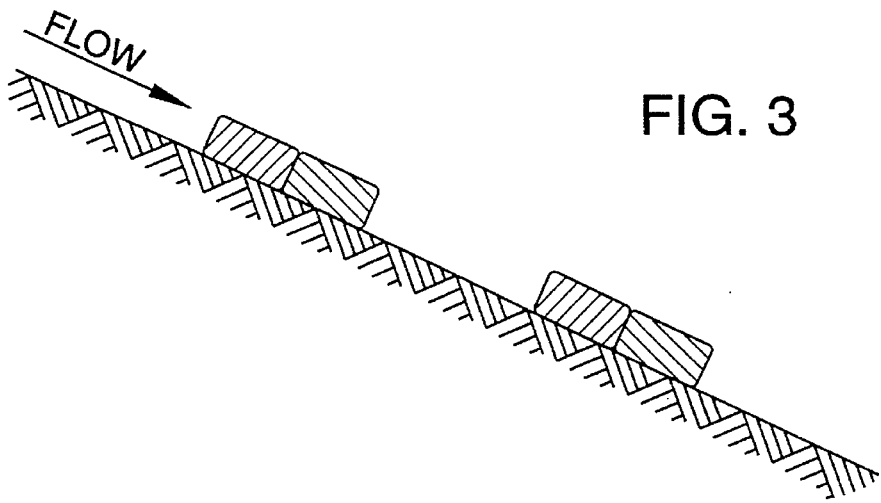
FIG. 3 is a cross section of the lines of bags along the section A—A' shown in FIG. 2.
Figure 4:
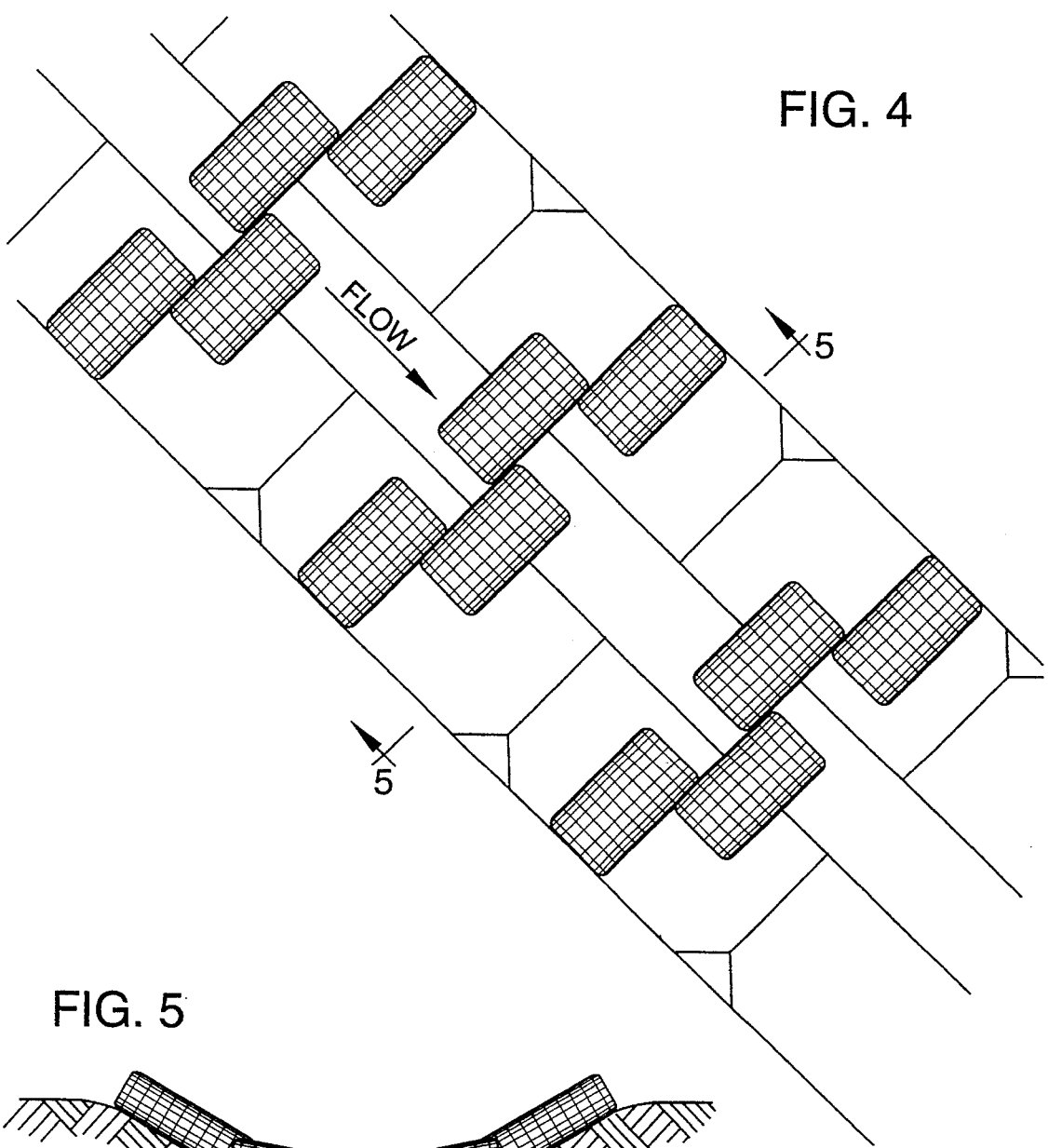
FIG. 4 is a plan view showing placement of biofilter bags in ditches and swales to control erosion therein.
Figure 5:
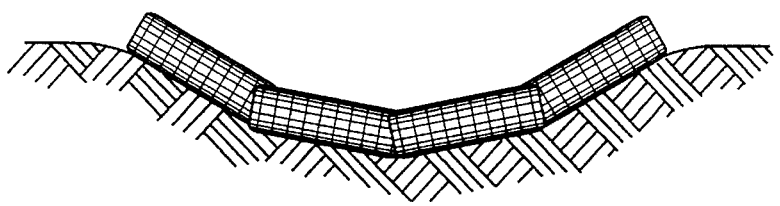
FIG. 5 is a cross section of the lines of bags along the section A—A' shown in FIG. 2.

Preparation of Biofilter Bags. Biofilter bags are prepared by filling porous bags with hammer-milled wood fragments. In the preferred embodiment the bagging material is a porous fabric made of extruded plastic. The first step in the process involves using a standard hammer mill to mill stump and log waste into small fragments. Through experimentation it has been discovered that other forms of preparing wood fragments, for example by using a chipper, produce unsuitable material for this invention. Because wood chips produced by a chipper have smooth surfaces, they tend to stick together and prevent the necessary flow of water through the bags. Biofilter bags filled with chipped wood fragments block water flow and gullies or channels form under the bags, thereby diminishing the value of the invention.

Wood fragments are next transported from the hammer mill to a screening device. The preferred mode of transportation is by a conveyor belt, which receives the wood fragments from a surge bin that keeps the flow of wood fragments constant.

The wood fragments are next fed into a shaker with a plurality of screens to produce size-selected wood fragments. Commonly the invention uses a two screen system with the upper screen having openings of 1½" and the lower screen having openings of ⅜". It has been determined through experimentation that biofilter bags containing wood fragments larger 1½" are too porous, whereas biofilter bags containing wood fragments smaller than ⅜" are not porous enough, tending to become clogged with sediment.

Next, the size-selected wood fragments are transported, commonly by a conveyor belt, to a commercially available bagging system. Extruded high density polyethylene of ½" mesh size, forming a cylindrical tube of about 12" diameter supplied by Norplex, Inc. of Seattle, Wash. is cut in the appropriate lengths to form bags of the desired length, commonly either 30" or 60". One end of a length of bagging material is fastened closed with a first closing device, commonly with a hog ring or a tie, the bag is filled from the bagger, and then the other end is fastened closed with a second closing device.

Use of Biofilter Bags. Biofilter bags can be used to prevent erosion in a multitude of applications where flowing water might otherwise cause erosion. Three common uses are on sloping surfaces, in ditches or swales, and around catch basins.

To prevent erosion on an exposed slope, biofilter bags are placed in a plurality of lines across the sloping surface, approximately along contour lines. The ends of bags typically overlap adjacent bags by about six inches. The bags may be staked in place if the slope or the flow rate of runoff require it. The number of lines of biofilter bags, and their spacing, depend on the slope and the rate of runoff. In regions of steep slope and high runoff the lines of bags should be placed closer together than in regions of gentle slope and low runoff. In some instances a single line of bags will be sufficient to control erosion.

To prevent erosion in a ditch or swale, Biofilter bags are placed in a plurality of lines across the ditch or swale. The ends of bags typically overlap adjacent bags by about six inches. The bags may be staked in place if the grade of the ditch or swale, or the flow rate of runoff require it. The number of lines of biofilter bags, and their spacing, depend on the grade and the rate of runoff. In regions of steep grade and high runoff the lines of bags should be placed closer together than in regions of gentle grade and low runoff. In some instances a single line of bags will be sufficient to control erosion.

To prevent silt from a construction area from clogging storm sewers, a plurality of biofilter bags are arranged around catch basins so that runoff water approaching the catch basins must first flow through the biofilter bags. The biofilter bags so arranged trap most of the silt suspended in the runoff water, permitting only silt-free water to enter the storm sewers.

I claim:

1. A water permeable erosion control bag, comprising:

a container having a flexible mesh wall with openings through which water can flow through the bag, wherein the mesh wall conforms to a surface on which the container sits; and discrete hammer-milled wood fragments within the container, wherein the wood fragments do not have smooth surfaces that tend to stick together when wet and form a mass of fragments that prevents flow of water through the bag, such that the hammer-milled wood fragments that do not have smooth surfaces resist adherence to other wood fragments within the container without becoming clogged with sediment carried by the water, and are large enough to be retained within the mesh wall, and allow a flow of water through the bag.

2. The erosion control bag of claim 1 wherein the wood fragments are large enough not to pass through a separation screen having ⅜ inch openings in the screen.

3. The erosion control bag of claim 1, wherein the mesh walls of the container have mesh openings that have a dimension of about ½ inch.

4. The erosion control bag of claim 1, wherein contents of the container consist essentially of the wood fragments.

5. The erosion control bag of claim 1 wherein the wood fragments are not retained by a separation screen having a screen opening of about 1½ inch.

6. The erosion control bag of claim 1 wherein the container comprises a plastic mesh.

7. A water permeable erosion control bag, comprising:

a flexible plastic tubular container having mesh walls through which water can flow, wherein the mesh walls conform to a surface on which the bag sits; and discrete hammer milled wood fragments within the container, wherein the wood fragments are formed in a hammer mill, and are not wood chips that have smooth surfaces that tend to stick together when wet and inhibit flow of water through the bag, such that the hammer milled wood fragments resist adherence to other wood fragments within the container and do not block water flow through the bag or form channels under the bag, wherein the hammer milled wood fragments are of a sufficient size to be retained within the container without becoming clogged with sediment that may be carried by the water, said hammer milled wood fragments being large enough to be retained by a ⅜ inch separator screen, and yet sufficiently small to pass through a 1½ inch separation screen.

8. The erosion control bag of claim 7, wherein the mesh is a polyethylene mesh.

9. A method of controlling erosion in a region of run-off, comprising the steps of:

providing a flexible container having mesh walls through which water can flow, and wood fragments within the container that are sufficiently large to be retained within the container and slow the flow of water through the container to allow silt carried by the water to be trapped by the container, wherein the wood fragments are hammer milled wood fragments that are produced in a hammer mill, such that the fragments have irregular surfaces that are not smooth like wood chips produced by a wood chipper, such that the wood fragments do not block water flow through the bag when wet; and placing the container on a surface in the region of run-off where soil erosion from water run-off is to be prevented to slow the flow of water and allow silt carried by the run-off to be retained by the wood fragments as water flows through the container, without forming channels under or around the bag.

10. A method of controlling erosion in a region of run-off, comprising the steps of:

providing a flexible container having mesh walls through which water can flow, and wood fragments within the container that are sufficiently large to be retained within the container and slow the flow of water through the container to allow silt carried by the water to be trapped by the container, wherein the wood fragments are hammer milled wood fragments that are produced in a hammer mill, such that the fragments have irregular surfaces that are not smooth like wood chips produced by a wood chipper, such that the wood fragments do not prevent flow of water through the container when wet; and placing the container on a surface in the region of run-off, where soil erosion from water run-off is to be controlled, to slow the flow of water and allow silt carried by the run-off to be retained by the wood fragments as water flows through the container, wherein the step of providing wood fragments within the container comprises providing hammer milled wood fragments that pass through a separation screen that retains fragments having a dimension larger than ⅜ inch, and that do not pass through a separation screen that retains fragments having a dimension larger than 1½ inch.

11. The method of claim 9, wherein the step of placing the container in the region of run-off further comprises placing a plurality of contiguous containers on the surface in the region of run-off.

12. The method of claim 9, wherein the container is tubular, and the step of placing the container in the region of the run-off further comprises placing the containers substantially parallel to each other, on the surface, transverse to a flow of run-off, with ends of the tubular containers longitudinally overlapping.

13. A method of making a water permeable erosion control bag, comprising the steps of:

providing a water permeable mesh container;

providing hammer milled wood fragments that are produced in a hammer mill instead of a wood chipper, such that the hammer milled wood fragments have irregular surfaces that are not smooth like wood chips produced by a wood chipper;

screening the wood fragments through a plurality of screens to obtain size-selected wood fragments that are large enough to allow water to flow through the bag without the bag becoming clogged with sediment carried by the water, and that are sufficiently small to slow the flow so that silt carried by the water will be retained by the wood fragments; and placing the size-selected wood fragments in the container, and closing the container.

14. A method of making a water permeable erosion control container, comprising the steps of:

providing a water permeable mesh container;

hammer milling wood in a hammer mill and not a wood chipper to produce hammer milled wood fragments, such that the hammer milled wood fragments have irregular surfaces that are not smooth like wood chips produced by a wood chipper;

screening the wood fragments to select wood fragments by passing the wood fragments through a plurality of screens to obtain size-selected wood fragments that pass through at least a ⅜ inch screen, to allow water to flow through the bag without becoming clogged with sediment carried by the water, and that are retained by a 1½ inch screen, to slow the flow of water so that silt carried by the water will be retained by the wood fragments; and placing the size-selected wood fragments in the container, and closing the container.

* * * * *